United States Patent
Lee

(10) Patent No.: US 8,515,838 B2
(45) Date of Patent: Aug. 20, 2013

(54) METHOD AND SYSTEM FOR PROVIDING HOUSEHOLD BUDGET BOOK SERVICES USING MOBILE TERMINALS

(75) Inventor: Jae Kyung Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 1908 days.

(21) Appl. No.: 10/870,443

(22) Filed: Jun. 18, 2004

(65) Prior Publication Data

US 2004/0260633 A1   Dec. 23, 2004

(30) Foreign Application Priority Data

Jun. 20, 2003   (KR) .................. 10-2003-0040020

(51) Int. Cl.
*G07F 19/00* (2006.01)
*G06Q 40/00* (2012.01)

(52) U.S. Cl.
USPC .................. 705/30; 705/33; 705/35

(58) Field of Classification Search
None
See application file for complete search history.

(56) References Cited

U.S. PATENT DOCUMENTS

| | | | |
|---|---|---|---|
| 6,446,048 B1 * | 9/2002 | Wells et al. | 705/35 |
| 6,636,873 B1 * | 10/2003 | Carini et al. | 707/201 |
| 2003/0040987 A1 * | 2/2003 | Hudson et al. | 705/30 |
| 2003/0081743 A1 * | 5/2003 | Chiang et al. | 379/93.08 |

\* cited by examiner

*Primary Examiner* — Asfand Sheikh
(74) *Attorney, Agent, or Firm* — KED & Associates, LLP

(57) ABSTRACT

A household budget book service system using mobile terminals is disclosed. The household budget book service system includes a master mobile terminal having budget book indexes for inputting a user's expenditures, capable of storing and sending any inputted expenditures, and receiving expenditures inputted in mobile terminals of the user's other family members that have been registered for integrated management of overall household expenditures, a budget book management server for receiving the expenditures inputted in the master mobile terminal and those inputted in each other family member's mobile terminal to control the operation of the master mobile terminal and capable of communicating with any card company's server and any bank's server, and a storing section connected to the budget book management server to store information sent from each mobile terminal according to the budget book indexes.

22 Claims, 2 Drawing Sheets

METHOD AND SYSTEM FOR PROVIDING HOUSEHOLD BUDGET BOOK SERVICES USING MOBILE TERMINALS

BACKGROUND OF THE INVENTION

1. Field of the Invention

The present invention relates generally to a system for providing household budget book services, and more particularly, to a method and a system for providing household budget book services using mobile terminals.

2. Description of the Related Art

A household budget book is a family's regular record of incomes and expenditures. This book shows the family's management of household expenses and financial conditions.

For good account-keeping, people need be sufficiently conscientious and pay particular attention to put down all amounts of money received or paid out everyday.

Actually, it is difficult to enter every paid amount at once in a household budget book. People generally remember or take notes of any amounts of money spent during a day and enter those amounts in the budget book later in the day.

Since it takes a great deal of effort and some time to keep accounts everyday, most people give up account-keeping or fail to continuously manage their household accounts for a long time.

With the rapid development of computer and telecommunication technologies and the explosive increase in the number of Internet users, services provided on the Internet are also greatly increasing.

On-line services available through the Internet include e-commerce, such as purchases at Internet shopping malls that enable users to purchase goods with reduced time and effort and Internet banking services that eliminate the need to visit banks.

Most on-line service providers send a purchase statement to each purchaser's e-mail address or mobile phone. Also, on-line shopping malls assign pages for registered members on their Web sites to enable them to check the items purchased.

In order to confirm all the amounts paid for e-commerce, users should access every related shopping mall site, credit card company's server and bank's server. Accordingly, the users may feel it is troublesome and time-consuming to enter such amounts in a household budget book.

SUMMARY OF THE INVENTION

The present invention substantially obviates one or more problems arising from limitations and disadvantages of the related art.

It is an object of the present invention to provide a handheld mobile terminal with a household budget book function for entering incomes, expenditures and e-commerce transactions and implement the budget book function in communication with various card companies' servers and Internet banking servers.

It is another object of the present invention to provide a system and a method for providing household budget book services using a plurality of mobile terminals, one of which is set as a master capable of integrated management of incomes, expenditures and e-commerce transactions inputted in the other mobile terminals which are set as slaves.

In order to accomplish the above objects and other advantages in accordance with the present invention, as embodied and broadly described herein, there is provided a system for providing household budget book services using mobile terminals, which comprises: a master mobile terminal having budget book indexes for inputting a user's expenditures, capable of storing and sending any inputted expenditures, and receiving expenditures inputted in mobile terminals of the user's other family members that have been registered for integrated management of overall household expenditures; a budget book management server for receiving the expenditures inputted in the master mobile terminal and those inputted in each other family member's mobile terminal to control the operation of the master mobile terminal and capable of communicating with any card company's server and any bank's server; and a storing section connected to the budget book management server to store information sent from each mobile terminal according to the budget book indexes.

Preferably, said master mobile terminal should have a function to add up all amounts of expenditures incurred by the user and the other family members immediately when inputted.

According to another aspect of the present invention, there is provided a method for controlling a household budget book service system using mobile terminals, which comprises the steps of: when a user inputs expenditures according to budget book indexes provided in a master mobile terminal, generating budget boot data in a predetermined area of the mobile terminal; sending the generated data to a corresponding budget book management server; updating, budget book data stored in the budget book management server based on the received data; and when information about additional expenditures is inputted from any of registered mobile terminals of the user's other family members, any card company or any bank, updating the budget book data again and storing the updated data in the master mobile terminal.

Preferably, said step of generating budget book data should comprise: selecting an item of expenditure incurred by the user from the budget book indexes provided in the mobile terminal and inputting an amount of expenditure; and generating data including current time, user and place of the expenditure and storing the generated data in a previously established database.

More preferably, said budget book indexes provided in the mobile terminal correspond to items of all possible household expenses for food, education, maintenance, credit card transactions, culture, savings, etc.

More preferably, said step of sending the generated budget book data to the management server should comprise: displaying the generated data in a display window of the mobile terminal; and sending the data to the management server.

More preferably, said step of storing the data in the master mobile terminal should comprise: updating the data sent to the budget book management server; sending the updated data to the registered mobile terminals of the other family members; when payment information is inputted from any card company or bank, updating the budget book data again; and downloading the updated data upon the user's demand and storing the same in the user's master mobile terminal.

Additional advantages, objects, and features of the invention will be set forth in part in the description which follows and in part will become apparent to those having ordinary skill in the art upon examination of the following or may be learned by practicing the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Wherever possible, the same reference numbers will be used throughout the drawings to refer to the same or like parts.

Figure 1:
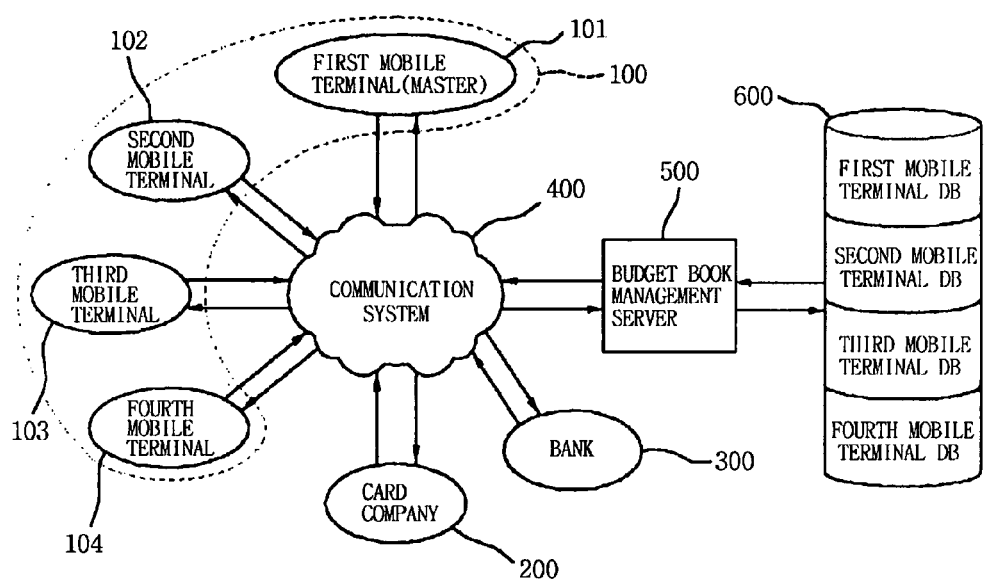
FIG. 1 is a view showing the structure of a system for providing household budget book services using mobile terminals according to the present invention.
Figure 2:
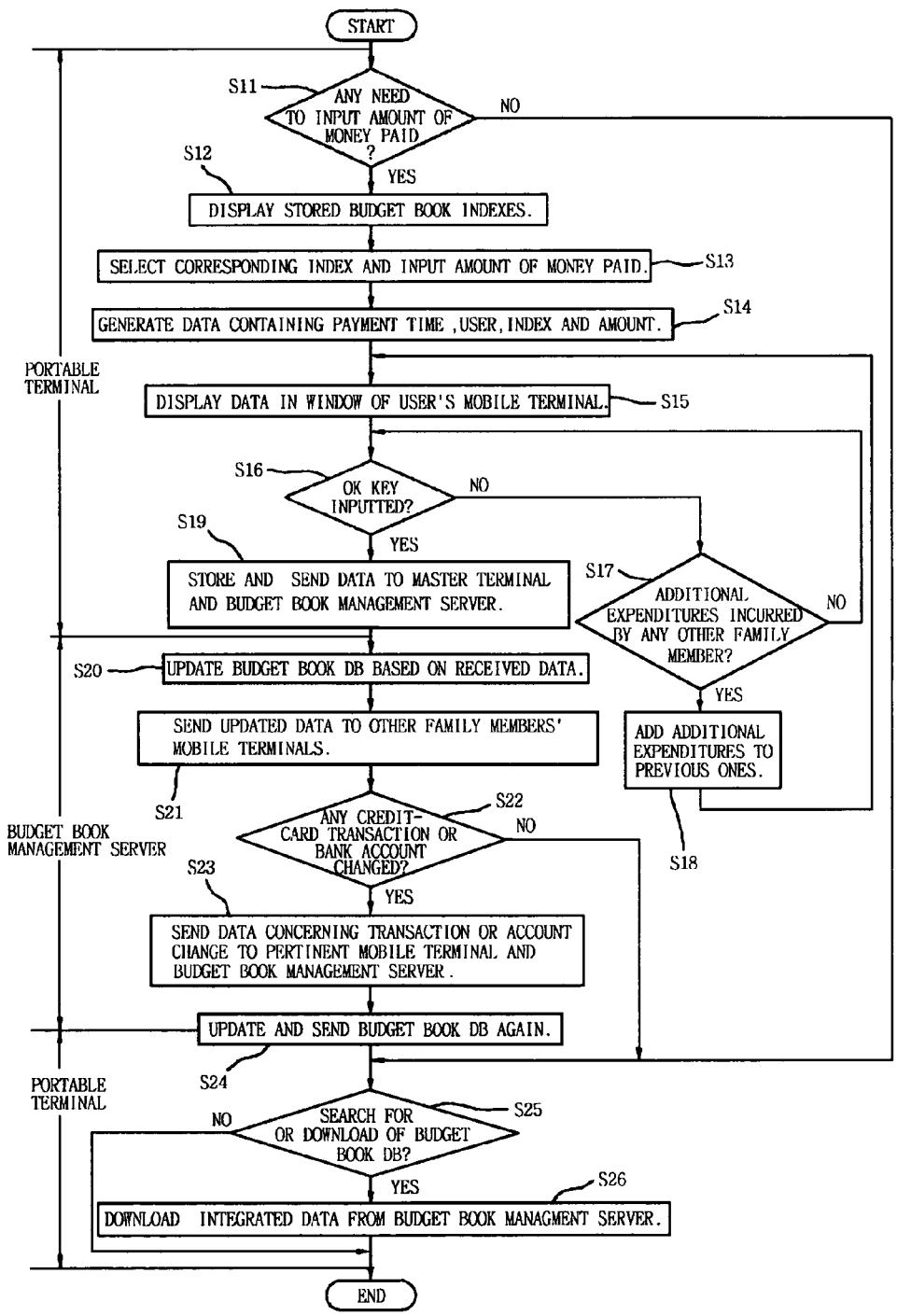
FIG. 2 is a flow chart showing a process of providing household budget book services using mobile terminals according to the present invention.

FIG. 1 is a view showing the structure of a system for providing household budget book services using mobile terminals according to the present invention. FIG. 2 is a flow chart showing a process of controlling the same system.

Referring to FIG. 1, a plurality of mobile terminals 100, e.g., first to fourth mobile terminals 101 to 104, store amounts of money received or paid by corresponding users in their memories (not shown) and display the stored data upon demand by the users. The mobile terminals 100 receive data on the users' e-commerce transactions, such as credit card transactions, and financial transactions from a budget book management server 500 and store the data in their memories to display the data upon demand by the users. Also, the mobile terminals 100 provide the budget book management server 500 with data on the incomes (or deposits) or expenditures as inputted by each user so that they can interwork with a household budget book software on the Web through the budget book management server 500. It is possible to set one of the mobile terminals 100 as a master and the others as slaves. In such a case, the slave mobile terminals should send data on the incomes and expenditures as inputted by their users both to the budget book management server 500 and to the master mobile terminal so that the incomes, expenditures and e-commerce transactions of the users of the slave mobile terminals can be managed by the master mobile terminal. For example, if a mother's or father's mobile terminal is set as a master in a family and children's mobile terminals are set as slaves, the mother or father can manage the amounts of money received (or deposited) and paid by the children. The mobile terminals 100 provide a variety of budget book indexes to facilitate the input by the users. The indexes may include items of all possible household incomes and expenditures for food, education, maintenance, etc.

The budget book management server 500 has a database 600 that assigns respective database areas for the plurality of mobile terminals 100 and stores the incomes, expenditures or e-commerce data received from the mobile terminals 100 in the corresponding database areas. The budget book management server 500 receives information about credit card transactions conducted by the users of the mobile terminals 100 from a relevant card company's server and stores the information in the database areas assigned for the corresponding users' mobile terminals. At the same time, the budget book management server 500 sends the same information to the corresponding mobile terminals. The budget book management server 500 receives information about Internet banking services used by the users of the mobile terminals from an Internet banking server and stores the information in the database areas assigned for the corresponding users' mobile terminals. At the same time, the budget book management server 500 sends the same information to the corresponding mobile terminals. In addition, the budget book management server 500 sends data stored in the respective database areas to the corresponding mobile terminals or only to a master of the mobile terminals.

The budget book management server 500 can make the data stored in the respective database areas available on the Web. Also, the budget book management server 500 modifies or updates the data when demanded by a user who has accessed through the Web or the master mobile terminal.

The operation of the household budget book service system using mobile terminals will be explained in more detail.

The mobile terminals 100 used by a plurality of family members can be a mother's first mobile terminal 101, a father's second mobile terminal 102 and children's third and fourth mobile terminals 103 and 104.

It is possible to set the mother's mobile terminal 101 as a master and the other family members' mobile terminals 102 to 104 as slaves.

The mother using the master mobile terminal 101 can receive data on incomes, expenditures or e-commerce transactions in real time when inputted in the second to fourth mobile terminals 102 to 104 through the budget book management server 500 for the integrated household management. Such data on incomes, expenditures or e-commerce transactions can be directly received or transmitted between the family's mobile terminals. The data is wirelessly and directly sent from the second to fourth mobile terminals 102 to 104 to the master mobile terminal 101.

Alternatively, the first mobile terminal 101 can download the data on incomes, expenditures or e-commerce transactions inputted in the second to fourth mobile terminals 102 to 104 from the budget book management server 500.

The first mobile terminal 101 can receive or download the data on incomes, expenditures or e-commerce transactions from the budget book management server 500 because data on the family's expenditures inputted in all the mobile terminals 101 to 104 and data transmitted from a card company 200 or a bank 300 on the family's credit-card transactions are all collected and managed by the budget book management server 500.

As a master, the first mobile terminal 101 can download such data from the budget book management server 500 and update the data whenever needed. If all the family's mobile terminals have been registered for integrated management, the first mobile terminal 101 can directly collect and manage the data inputted in the mobile terminals 102 to 104, without the need to download the data from the budget book management server 500. The data is wirelessly and directly sent from the mobile terminals 102 to 104 to the first mobile terminal 101.

For example, if the mother paid 57,000 won to buy some food, she can select the item "food" from the budget book indexes provided in the first mobile terminal 101 and input the amount of 57,000 won. The indexes may include items of all possible household incomes and expenses for food, education, maintenance, etc.

The first mobile terminal 101 stores information about when and by whom the expenditure in the amount of 57,000 won was incurred in a form of "03/04/23__16:43 Mom buying food" in its embedded memory (not shown). At the same time, the first mobile terminal 101 sends the same information to the budget book management server 500. Upon receiving the information, the budget book management server 500 updates the total amount of expenditures inputted from the first mobile terminal and stores the updated data in the corresponding database area of the storing section 600.

Also, the budget book management server 500 receives data on expenditures inputted in the second to fourth mobile terminals 102 to 104 and data transmitted from the card company 200 or the bank 300 on credit-card transactions or financial transactions, and stores both data in the corresponding database areas assigned for the respective mobile terminals. After updating the total amount of the family's overall expenditures, the budget book management server 500 sends the updated data to the first mobile terminal 101.

Accordingly, if one or more of the second to fourth mobile terminals 102 to 104 is registered for the integrated household management, every amount of expenditure inputted in the registered mobile terminals will be informed to the first mobile terminal 101 and added up immediately. For the expenditures incurred by the user of a non-registered mobile terminal, the first mobile terminal 101 can receive and manage the expenditure data through the budget book management server 500. Updated data on the family's expenditures can be transmitted to all of the first to fourth mobile terminals 101 to 104.

In case of a credit card transaction, the card company 200 sends its approval of the use of a credit card to the corresponding user's mobile terminal and at the same time to die master first mobile terminal 101, thereby enabling the integrated management by the first mobile terminal 101.

Also, if each family member's bank account information has been previously inputted, paying-in or paying-out from any account will be immediately reflected as an income or expenditure.

Hereinafter, a process of controlling the budget book service system using mobile terminals according to the present invention will be explained in detail with reference to FIG. 2. A user who wishes to input any expenditure can have his or her mobile terminal to display the stored budget book indexes (S11 and S12).

The user can select an item corresponding to the expenditure from the displayed indexes and input the amount of expenditure in the mobile terminal (S13).

The mobile terminal generates data concerning the expenditure time and the user, and displays the data in its display window (S14 and S15).

Subsequently, the mobile terminal determines whether the user has inputted an OK key (S16).

If it is determined that the OK key has not been inputted (S16), the mobile terminal will then determine whether any other family member of the user has incurred expenditure (S17).

If no expenditure has been incurred by the other family members (S17), the mobile terminal will return to the previous step S16. If any expenditure has been incurred, the mobile terminal will add the amount of the current expenditure to the previously stored amount and will return to step S18.

If the user has inputted the OK key (S16), the generated data will be stored in both the user's mobile terminal and a mobile terminal that has been set as a master or a server, and will be sent to the budget book management server 500 (S19).

The budget book management server 500 updates the stored data based on the newly inputted data (S20).

Also, the budget book management server sends the updated data to all family members' mobile terminals that are connected to the budget book management server (S21).

It is also determined whether there is any credit card transaction or any change in a bank account due to deposit or withdrawal (S22).

If there is (S22), data on the credit card transaction or the account change will be sent to the corresponding, user's mobile terminal, master mobile terminal and budget book management server (S23).

The budget book management server updates the stored data based on the newly received data and sends the updated data to all the family members' mobile terminals (S24).

Any user can access the budget book management server to search for or download the integrated data of the family's budget book (S25 and S26).

As described above, the budget book service system using handheld mobile terminals and the method of controlling the system according to the present invention provide the mobile terminals with a budget book function. If one of the family members' mobile terminals is set as a master and the other mobile terminals are registered for the integrated household management, all amounts of expenses incurred by each family member can be immediately added up and managed by the master mobile terminal. The expenditure data will also be sent to the budget book management server. Since the budget book management server also receives income and expenditure data of a family member having a non-registered mobile terminal, it can integratedly manage the overall household accounts of the family.

The budget book service system and the method for controlling the system according to the present invention have the following advantages and effects.

First of all, every time any money is spent, a user can easily enter the amount of money at once on his or her handheld mobile terminal with less inputs. Also, any credit-card transaction or any change in a bank account due to deposit or withdrawal is immediately informed to a master mobile terminal for the easy, integrated management of household accounts.

Secondarily, if one of a family's mobile terminals is set and registered as a master, expenditures as inputted in the family members' mobile terminals other than the master will be informed immediately to the master for the efficient, integrated management of the household accounts.

Thirdly, a budget book management server, as well as the master mobile terminal, can manage the family's household accounts, and thus each user can search for or download the family's budget book data at any time and any place with improved convenience.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for providing household budget book services using mobile terminals with a budget book function, comprising:

receiving data on e-commerce transactions conducted by a plurality of users from an e-commerce service server;

registering the data in a plurality of database areas respectively assigned for the users;

sending the registered data to the users' slave mobile terminals respectively;

sending the registered data for the users to a master mobile terminal;

receiving inputted expenditure or transaction information at each of a plurality of slave mobile terminals; and sending the expenditure or transaction information from the plurality of slave mobile terminals to both the master mobile terminal and a budget book management server, wherein the expenditure or transaction information is directly sent from each of the slave mobile terminals to the master mobile terminal without downloading the expenditure or transaction information from the budget book management server, wherein when the slave mobile terminals are registered for the household budget book service, the master mobile terminal directly receives the expenditure or transaction information inputted in the registered slave mobile terminals without downloading the expenditure or transaction information from the budget book management server, and for the expenditures or transactions incurred by the user of a non-registered slave mobile terminal, the master mobile terminal receives the expenditure or transaction information through the budget book management server.

2. The method according to claim 1, further comprising displaying the data sent or inputted to the mobile terminal to be checked by the user.

3. The method according to claim 1, further comprising enabling the user to search for the data registered in the database area on the Web.

4. The method according to claim 1, further comprising downloading the data registered in the database area to the user's slave mobile terminal upon the user's demand.

5. A method for providing household budget book services using mobile terminals, comprising:

receiving data on credit-card transactions conducted by a plurality of users from a card company's server;

registering the data in a plurality of database areas assigned for the users;

sending the registered data to the users' slave mobile terminals respectively;

sending the registered data for the users to a master mobile terminal;

receiving inputted expenditure or transaction information at each of a plurality of slave mobile terminals; and sending the expenditure or transaction information from the plurality of slave mobile terminals to both the master mobile terminal and a budget book management server, wherein the expenditure or transaction information is directly sent from each of the slave mobile terminals to the master mobile terminal without downloading the expenditure or transaction information from the budget book management server, wherein when the slave mobile terminals are registered for the household budget book service, the master mobile terminal receives the expenditure or transaction information inputted in the registered slave mobile terminals without downloading the expenditure or transaction information from the budget book management server, and for the expenditures or transactions incurred by the user of a non-registered slave mobile terminal, the master mobile terminal receives the expenditure or transaction information through the budget book management server.

6. A method for providing household budget book services using mobile terminals, comprising:

receiving data on financial transactions in a plurality of users' bank accounts from a bank's server;

registering the data in a plurality of database areas respectively assigned for the users;

sending the registered data to the users' slave mobile terminals respectively;

sending the registered data for the users to a master mobile terminal;

receiving inputted expenditure or transaction information at each of a plurality of slave mobile terminals; and sending the expenditure or transaction information from the plurality of slave mobile terminals to both the master mobile terminal and a budget book management server, wherein the expenditure or transaction information is directly sent from each of the slave mobile terminals to the master mobile terminal without downloading the expenditure or transaction information from the budget book management server, wherein when the slave mobile terminals are registered for the household budget book service, the master mobile terminal receives the expenditure or transaction information inputted in the registered slave mobile terminals without downloading the expenditure or transaction information from the budget book management server, and for the expenditures or transactions incurred by the user of a non-registered slave mobile terminal, the master mobile terminal receives the expenditure or transaction information through the budget book management server.

7. A method for providing household budget book services using mobile terminals, comprising:

storing data on incomes or expenditures respectively inputted by a plurality of users in slave mobile terminals;

sending the stored data to a budget book management server;

registering the data in a plurality of database areas respectively assigned for the users;

sending the registered data for the users to a master mobile terminal;

receiving inputted expenditure or transaction information at each of a plurality of slave mobile terminals; and sending the expenditure or transaction information from the plurality of slave mobile terminals to both the master mobile terminal and the budget book management server, wherein the expenditure or transaction information is directly sent from each of the slave mobile terminals to the master mobile terminal without downloading the expenditure or transaction information from the budget book management server, wherein when the slave mobile terminals are registered for the household budget book service, the master mobile terminal receives the expenditure or transaction information inputted in the registered slave mobile terminals without downloading the expenditure or transaction information from the budget book management server, and for the expenditures or transactions incurred by the user of a non-registered slave mobile terminal, the master mobile terminal receives the expenditure or transaction information through the budget book management server.

8. The method according to claim 7, wherein the slave mobile terminal is provided with budget book indexes that facilitate the user's input.

9. The method according to claim 7, further comprising enabling the user to search for the data registered in the database area on the Web.

10. The method according to claim 7, further comprising downloading the data registered in the database area to the user's slave mobile terminal upon the user's demand.

11. A system for providing household budget book services using mobile terminals with a budget book function, the system comprising:
    an e-commerce service server for sending data on e-commerce transactions conducted by a plurality of users;
    a budget book management server for receiving the data on e-commerce transactions from the e-commerce service server and registering the received data in a plurality of database areas respectively assigned for the users;
    a plurality of slave mobile terminals for receiving the registered data on e-commerce transactions from the budget book management server and enabling the users to search for the data, each of the plurality of slave mobile terminals to respectively receive inputted expenditure or transaction information and to provide the received inputted expenditure info nation to both the budget book management server and a master mobile terminal, and
    the master mobile terminal for receiving the registered data for the users from the budget book management server, and for directly receiving the inputted expenditure or transaction information from each of the plurality of slave mobile terminals in real time without downloading the expenditure or transaction information from the budget book management server,
    wherein when the slave mobile terminals are registered for the household budget book service, the master mobile terminal receives the expenditure or transaction information inputted in the registered slave mobile terminals without downloading the expenditure or transaction information from the budget book management server, and
    for the expenditures or transactions incurred by the user of a non-registered slave mobile terminal, the master mobile terminal receives the expenditure or transaction information through the budget book management server.

12. The system according to claim 11, wherein the slave mobile terminals display the received or inputted data to be checked by each user.

13. The system according to claim 11, wherein the budget book management server enables each user to search for the data registered in the database area on the Web.

14. The system according to claim 11, wherein the budget book management server downloads the data registered in the database area to the user's slave mobile terminal upon the user's demand.

15. A system for providing household budget book services using mobile terminals with a budget book function, the system comprising:
    a card company's server for sending data on credit-card transactions conducted by a plurality of users;
    a budget book management server for receiving the data on credit-card transactions from the card company's server and registering the received data in a plurality of database areas respectively assigned for the users; and
    a plurality of slave mobile terminals for receiving the registered data on credit-card transactions from the budget book management server and enabling the users to search for the data, each of the plurality of slave mobile terminals to respectively receive inputted expenditure or transaction information and to provide the received inputted expenditure information to both the budget book management server and a master mobile terminal; and
    the master mobile terminal for receiving the registered data for the users from the budget book management server, and for directly receiving the inputted expenditure or transaction information from each of the plurality of slave mobile terminals in real time without downloading the expenditure or transaction information from the budget book management server,
    wherein when the slave mobile terminals are registered for the household budget book service, the master mobile terminal receives the expenditure or transaction information inputted in the registered slave mobile terminals without downloading the expenditure or transaction information from the budget book management server, and
    for the expenditures or transactions incurred by the user of a non-registered slave mobile terminal, the master mobile terminal receives the expenditure or transaction information through the budget book management server.

16. The system according to claim 15, wherein the budget book management server downloads the data registered in the database area to the user's slave mobile terminal upon the user's demand.

17. A system for providing household budget book services using mobile terminals with a budget book function, the system comprising:
    a bank's server for sending data on financial transactions in a plurality of users' bank accounts;
    a budget book management server for receiving the data on financial transactions from the bank's server and registering the received data in a plurality of database areas respectively assigned for the users;
    a plurality of slave mobile terminals for receiving the registered data on financial transactions from the budget book management server and enabling the user to search for the data, each of the plurality of slave mobile terminals to respectively receive inputted expenditure or transaction information and to provide the received inputted expenditure information to both the budget book management server and a master mobile terminal; and
    the master mobile terminal for receiving the registered data for the users from the budget book management server, and for directly receiving the inputted expenditure or transaction information from each of the plurality of slave mobile terminals in real time without downloading the expenditure or transaction information from the budget book management server,
    wherein when the slave mobile terminals are registered for the household budget book service, the master mobile terminal receives the expenditure or transaction information inputted in the registered slave mobile terminals without downloading the expenditure or transaction information from the budget book management server, and
    for the expenditures or transactions incurred by the user of a non-registered slave mobile terminal, the master mobile terminal receives the expenditure or transaction information through the budget book management server.

18. The system according to claim 17, wherein the budget book management server downloads the data registered in the database area to the user's slave mobile terminal upon the user's demand.

19. A system for providing household budget book services using a plurality of mobile terminals with a budget book function, the system comprising:
    a plurality of slave mobile terminals for storing data on incomes or expenditures respectively inputted by a plurality of users, each of the plurality of slave mobile terminals to respectively receive inputted expenditure or transaction information and to provide the received inputted expenditure information to both a budget book management server and a master mobile terminal;

the budget book management server for registering the data on incomes or expenditures in a plurality of database areas respectively assigned for the users; and the master mobile terminal for receiving the registered data for the users from the budget book management server, and for directly receiving the inputted expenditure or transaction information from each of the plurality of slave mobile terminals in real time without downloading the expenditure or transaction information from the budget book management server, wherein when the slave mobile terminals are registered for the household budget book service, the master mobile terminal receives the expenditure or transaction information inputted in the registered slave mobile terminals without downloading the expenditure or transaction information from the budget book management server, and for the expenditures or transactions incurred by the user of a non-registered slave mobile terminal, the master mobile terminal receives the expenditure or transaction information through the budget book management server.

20. The system according to claim 19, wherein the budget book management server sends data on incomes or expenditures of each user of the slave mobile terminals directly to the master mobile terminal.

21. The system according to claim 19, wherein the slave mobile terminals are provided with budget book indexes that facilitate the input by users.

22. The system according to claim 19, wherein the budget book management server downloads the data registered in the database area to the user's slave mobile terminal upon the user's demand.

* * * * *